US007827467B2

(12) United States Patent
Wenger et al.

(10) Patent No.: US 7,827,467 B2
(45) Date of Patent: Nov. 2, 2010

(54) METHOD FOR CHECKING OF VIDEO ENCODER AND DECODER STATE INTEGRITY

(75) Inventors: Stephan Wenger, Tampere (FI); Miska Hannuksela, Ruutana (FI); Ye-Kui Wang, Tampere (FI)

(73) Assignee: Nokia Corporation, Espoo (FI)

( * ) Notice: Subject to any disclaimer, the term of this patent is extended or adjusted under 35 U.S.C. 154(b) by 1017 days.

(21) Appl. No.: 11/325,264

(22) Filed: Jan. 4, 2006

(65) Prior Publication Data
US 2007/0157070 A1    Jul. 5, 2007

(51) Int. Cl.
*H03M 13/00* (2006.01)

(52) U.S. Cl. ............... 714/758; 714/781; 714/807; 375/240.27; 375/240.28

(58) Field of Classification Search ............ 714/48, 714/52, 54, 758, 807, 781; 375/240.27, 240.28
See application file for complete search history.

(56) References Cited

U.S. PATENT DOCUMENTS

| 6,266,736 | B1 * | 7/2001  | Atkinson et al. ........... 711/103 |
| 6,621,868 | B1   | 9/2003  | Kimata et al. |
| 6,742,188 | B1 * | 5/2004  | Del Castillo ............... 725/153 |
| 6,871,295 | B2 * | 3/2005  | Ulrich et al. ................ 714/6 |
| 6,934,904 | B2 * | 8/2005  | Talagala et al. ............ 714/770 |
| 6,964,008 | B1 * | 11/2005 | Van Meter, III ............ 714/807 |
| 7,103,684 | B2 * | 9/2006  | Chen et al. ................. 710/62 |
| 2002/0116715 | A1 | 8/2002 | Apostolopoulos |
| 2004/0218669 | A1 | 11/2004 | Hannuksela |
| 2005/0031219 | A1 | 2/2005 | Puri |

FOREIGN PATENT DOCUMENTS

| EP | 1732331        | 12/2006 |
| KR | 1999-30000     | 4/1999  |
| WO | WO 2004023703  | 3/2004  |
| WO | WO 2005043882  | 5/2005  |

OTHER PUBLICATIONS

Office action dated Aug. 31, 2009 with translation from Korean Application No. 10-2008-7016221, 11 pages.
Office action dated Sep. 4, 2009 from Singapore Application No. 200804978-5, 11 pages.
International Search Report and Written Opinion dated May 23, 2007 from PCT Application No. PCT/IB2006/003081, 12 pages.

* cited by examiner

*Primary Examiner*—Esaw T Abraham
(74) *Attorney, Agent, or Firm*—Hollingsworth & Funk, LLC

(57) ABSTRACT

The present invention provides a method and a system for verifying a match between states of a first video processor and a second video processor, wherein one of said first and second video processors is a video encoder utilizing predictive video encoding and the other one of said first and second video processors is a video decoder capable of reproducing a decoded bit stream from an encoded bit stream generated by said video encoder.

21 Claims, 2 Drawing Sheets

METHOD FOR CHECKING OF VIDEO ENCODER AND DECODER STATE INTEGRITY

FIELD OF TECHNOLOGY AND BACKGROUND OF THE INVENTION

The present invention relates to the field of predictive video coding, particularly to ensuring a proper match between encoder and decoder states.

Most current video compression algorithms require keeping state information between the decoding of pictures. One obvious example is the reference picture(s) used for inter picture prediction. When errors have occurred during the bit stream transmission from the encoder to the decoder this decoder state is normally corrupted. However, only in a few cases a decoder can determine the presence of corruption from the bit stream itself. In other cases, external means (e.g. sequence numbering of transmission packets) can also be used to determine presence of possible corruption.

Corruption of the decoder state can occur due to erroneous transmission of the bit stream. At the decoder, while most transport stacks contain indication of possible bit stream corruption, it is unclear in which data structure the corruption occurs (if at all possible to determine that corruption occurred). For example, damaged slice data can lead to a corrupted reference picture used for future prediction, and a damaged or lost in-band parameter set transmission can lead to a lost or damaged parameter set, that may be referenced later.

Before this invention, no mechanism was known which allowed an encoder to inform a decoder about its internal state, in a lightweight manner. Also, previously no mechanism was known that allowed a decoder to inform an encoder about its internal state, without inferring a corruption (or non-corruption). In other words, no means existed by which a decoder can (for example periodically) inform an encoder about its state without having performed error detection and explicitly sending information that positively or negatively informs the encoder about corruption.

The following decoder to encoder feedback messages are known from prior art. They all infer corruption or non-corruption implicitly. In order to generate these prior art messages; the error detection has to be performed by the message sender (the decoder).

NEWPRED reference picture feedback messages (see for example U.S. Pat. No. 6,621,868 and Kimata, H., et al, "Study on Adaptive Reference Picture Selection Coding Scheme for the NEWPRED Receiver-Oriented Mobile Visual Communication," IEEE Global Telecommunications Conference, Nov. 8-12, 1998. (8 pages), ITU-T Rec. H.263 Annex N): The decoder can inform an encoder about the known corruption or known non-corruption of a reference picture with a certain ID. The encoder can use this information to use an older reference picture for inter picture prediction, which is known to be uncorrupted (at the decoder). However, the decoder cannot simply send information about its state and let the encoder decide whether corruption or non-corruption exists. In other words, the burden of error detection lies at the decoder, not at the encoder.

Packet loss back channel signaling (e.g. ARQ): These techniques signal back the non-arrival of a packet in order to trigger re-sending. This is information wherein the state of a receiver ("packets x, y, z are lost") is conveyed. However, this is not a "state" in the sense of a video decoder state that pertains over data entities other than packets.

Full Intra Request, picture loss indication, slice loss indication, and similar video-related mechanisms indicating corruption: These are available in many different standards, e.g. in the "Extended RTP Profile for RTCP-based Feedback (RTP/AVPF)" Internet Draft (AVPF, please see http://http://www.ietf.org/internet-drafts/draft-ietf-avt-rtcp-feedback-11.txt), or in the ITU-T Rec. H.245. All these require the error detection to be performed at the decoder.

It is the object of the present invention to provide means for validating a proper match between encoder and decoder states. In the present invention error detection is enabled to be handled by the message receiver, in contrast to the above identified prior art requiring the error detection to be performed at the message sender. Furthermore state of the art feedback messages infer corruption or non-corruption, whereas messages according to the invention are "neutral".

SUMMARY OF THE INVENTION

The invention provides means to calculate checksum information in a video encoder, a signal to convey the checksum information from the video encoder to a video decoder, means to check the integrity of the state information in the video decoder, and means to signal the state information of the video decoder to the video encoder.

According to one aspect of the present invention a method for verifying a match between states of a first video processor and a second video processor is provided. One of said first and second video processors is a video encoder utilizing predictive video encoding and the other one of said first and second video processors is a video decoder capable of reproducing a decoded video sequence from an encoded bit stream generated by said video encoder. The method comprises generating, at said first video processor, a first indication of one or more properties of a first state of said first video processor; and transmitting a message comprising said indication to said second video processor.

The message also comprises additional information enabling the second video processor to identify which properties said indication has been generated for. This method according to the invention enables to match the states of video encoders and decoders, in order to perform appropriate error handling procedures in case of transmission-related or other corruption of the encoded bit stream.

According to an exemplary embodiment the method further comprises generating, at said second video processor, a second indication of said properties of a second state of said second video processor; and verifying if said first and second states of said first and second video processors match, by comparing said first and second indications.

According to an exemplary embodiment the method further comprises performing error handling procedures in case said states do not match.

According to an exemplary embodiment said indication comprises a checksum, and wherein said generating step comprises:

calculating said checksum.

It will be necessary to somehow standardize this calculation, in order to ensure that encoders/decoders from different vendors are interoperable.

According to an exemplary embodiment said checksum is calculated by at least one algorithm from the group comprising Binary Copy, Exclusive OR (XOR), Cyclic Redundancy Code (CRC), Secure Hash Algorithm (SHA1, defined in US National Institute of Standards and Technology (NIST). FIPS Publication 180: Secure Hash Standard (SHS). May 1993), or Message Digest 5 (MD5, defined in IETF RFC 1321).

According to an exemplary embodiment the indication comprises an encoded copy of said properties of said first state according to at least one encoding method from the group comprising Binary, Base16, Base64 (see IETF RFC 3548) and Abstract Syntax Notation 1 (ASN.1, see ITU-T Rec. X.680).

According to an exemplary embodiment said properties of said first state comprise at least one from the group comprising:

- active Picture Parameter Sets (PPS);
- active Sequence Parameter Sets (SPS);
- Picture Parameter Sets (PPS) with index x;
- Sequence Parameter Sets (SPS) with index x;
- Picture Parameter Sets (PPS) with index x and referred Sequence Parameter Sets (SPS);
- all Picture Parameter Sets (PPS);
- all Sequence Parameter Sets (SPS);
- most recent reference picture in the Decoded Picture Buffer (DPB);
- all reference pictures in the Decoded Picture Buffer (DPB) used for prediction;
- all reference pictures in the Decoded Picture Buffer (DPB).

According to an exemplary embodiment said first video processor is said video encoder and said second video processor is said video decoder.

According to an exemplary embodiment said message is transmitted inside of said bit stream and may be a Supplemental Enhancement Information (SEI) message.

According to an exemplary embodiment said message is transmitted separately from said bit stream, and said message may also comprise synchronization information for associating said indication, e.g. a checksum, with the point of generation of said indication. That is, such a message sent in an out-of-band fashion has to be synchronized with the bit stream in some manner.

According to an exemplary embodiment said first video processor is said video decoder and said second video processor is said video encoder.

According to an exemplary embodiment said message is transmitted using at least one protocol from the group comprising Real-Time Control Protocol (RTCP, see IETF RFC 3550), ITU-T Rec. H.225 and ITU-T Rec. H.245.

According to an exemplary embodiment said message also comprises synchronization information for associating said indication, e.g. a checksum, with the point of generation of said indication.

According to another aspect of the invention a computer readable medium is provided, comprising code sections stored thereon, for instructing a processor to perform the steps of:

- generating, at a first video processor, a first indication of one or more properties of a first state of said first video processor; and
- transmitting a message comprising said indication to a second video processor.

In an exemplary embodiment the computer readable medium further comprises code sections stored thereon, for instructing a processor to perform the additional steps of:

- generating, at said second video processor, a second indication of said properties of a second state of said second video processor; and
- verifying if said first and second states of said first and second video processors match, by comparing said first and second indications.

According to yet another aspect of the invention a system for verifying a match between states of a first video processor and a second video processor is provided, wherein one of said first and second video processors is a video encoder utilizing predictive video encoding and the other one of said first and second video processors is a video decoder capable of reproducing a decoded video sequence from an encoded bit stream generated by said video encoder. In the system, the first video processor comprises

- a component for generating a first indication of one or more properties of a first state of said first video processor; and
- a component for transmitting a message comprising said indication to said second video processor;

and the second video processor comprises

- a component for generating a second indication of said properties of a second state of said second video processor; and
- a component for verifying if said first and second states of said first and second video processors match, by comparing said first and second indications.

In an exemplary embodiment the second video processor further comprises

- a component for performing error handling procedures in case said states do not match.

BRIEF DESCRIPTION OF THE DRAWINGS

The drawings are provided in an exemplary manner only, for illustrating the principles of the present invention. In the drawings

DETAILED DESCRIPTION OF THE INVENTION

The main differentiation between messages according to this invention and prior art feedback messages lies in two aspects:

a) Conventional feedback messages infer corruption or non-corruption, whereas messages according to the invention are "neutral"; and b) in order to generate prior art messages, the error detection has always to be performed by the message sender, whereas in the present invention the error detection is handled by the message receiver.

In the following detailed description, we use terminology used in conjunction with the ITU-T Rec. H.264 video compression standard. However, it should be obvious to a person skilled in the art that the present invention will work equivalently with other standardized and non-standardized video compression algorithms that utilize any form of predictive coding. Thus the invention is not limited to the use of H.264.

Figure 1:
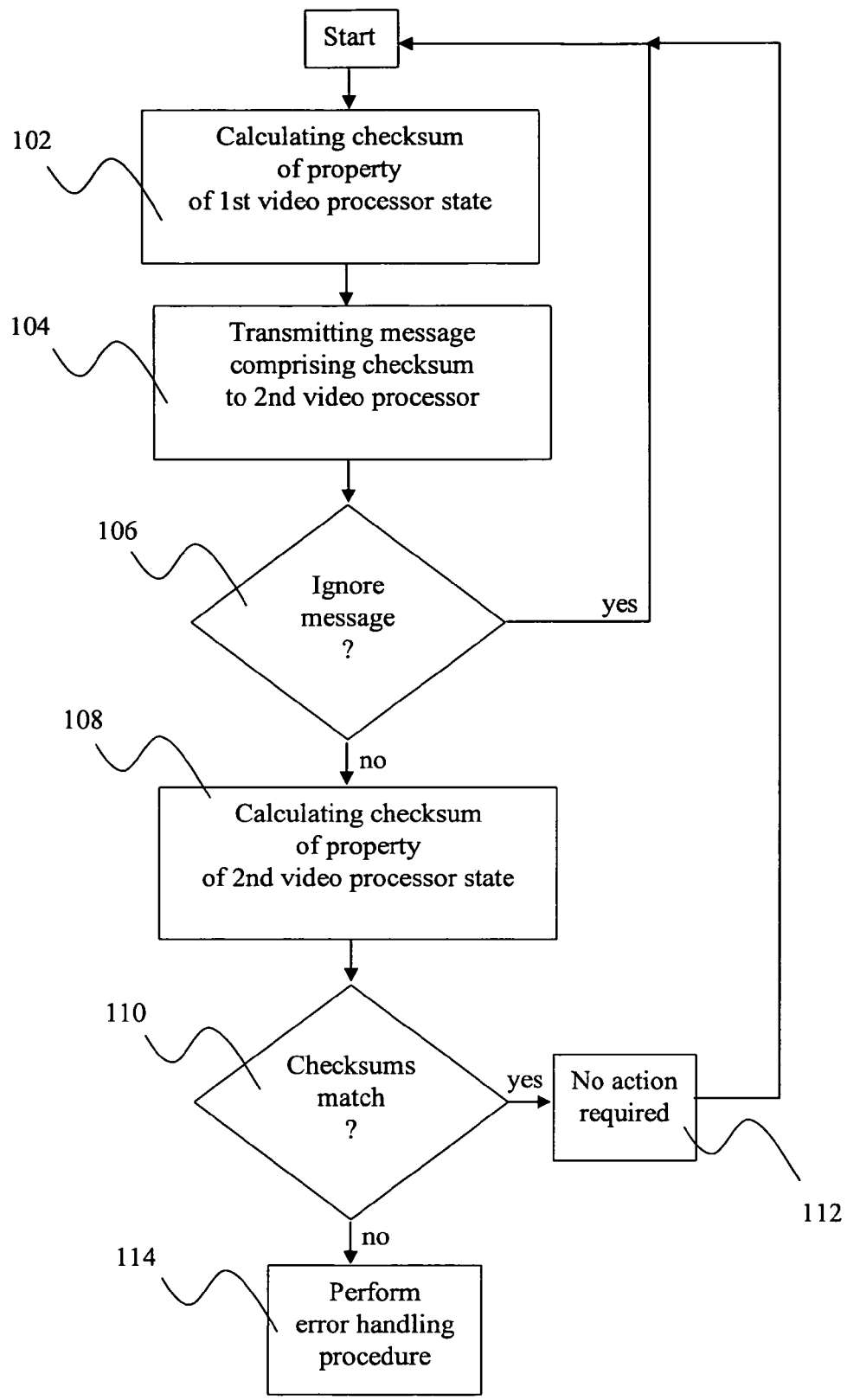
FIG. 1 illustrates a flow-diagram of steps of an embodiment of the inventive method.

In FIG. 1 a flow diagram of steps of an exemplary embodiment are illustrated. After start the first video processor calculates a checksum, according to one of different algorithms which shall be mentioned later on, of a state of the first video processor in step 102. There are a number of possible properties which are useful in this case, which shall be mentioned also later on.

In step 104 the first video processor transmits a message comprising the calculated checksum to a second video processor. The second video processor can now decide, in step 106, if he wants to ignore the message, that is, do not perform any error checking. In case this is so the process begins again.

If it is decided that the message shall be utilized for error checking the second video processor calculates a checksum (step 108) over the same property as the first video processor. It will be necessary to ensure that both video processors do use the same standard/algorithm for calculating this checksum.

In step 110 it is determined if the two checksums match. In case of a positive match no further action is required (step 112), the process is started again.

However, in case the checksums do not match, the appropriate error handling procedures can be performed in step 114. When the first video processor is a video encoder (forward transmission of the checksum information), for example a prior art feedback message can be send, a request for resending a reference picture or the like. When the first video processor is a video decoder (reverse transmission of the checksum information) the video encoder as receiver of the checksum can refrain from using known-as-corrupt state information in the decoder, e.g. by not using certain known-as-corrupt reference pictures for prediction.

Now two exemplary use cases for utilizing the present invention shall be presented:

Use case 1: The video sender wants to facilitate error detection in video receiver. Video sender creates checksums over its state information at a given time, and sends the state information as an H.264 SEI message to the receiver. The receiver can react to this message by calculating identical checksums over its state, and, if the two checksums don't match, performing an appropriate procedure (which could mean e.g. sending a prior art feedback message such as a Reference Picture Selection request; Full Intra Request, or similar. See for example ITU-T Rec. 245 for these prior art feedback messages).

Use case 2: The video decoder wants to check its integrity of state on its own initiative (e.g. because it considers corruption possible but has no sure knowledge of it). The video decoder generates a checksum over the parts of its state it wants to check, and sends this checksum along with timing information to the video encoder. The video encoder checks whether the decoder's state is accurate. If yes, there is no need for action. If no, the video encoder knows in which data structure the problem exists and can react accordingly.

Possible reactions comprise:
During the coding process of future pictures, refraining from referencing those reference pictures that are (after reception of the checksum) known as being corrupt at the decoder;
Sending parameter sets that are known to be corrupt, and/or refraining from referencing known-as-corrupt parameter sets in the coding process of future pictures;
When large parts of the state are corrupted (worst case), re-establishing the complete state information at the decoder by sending all parameter sets and an Independent Decoder Refresh Point (IDR) Picture.

First, it shall be described how a message from an encoder to a decoder can facilitate the error handling in the decoder ("use case 1").

For the sake of simplicity fixed parameter sets and only a single reference picture are assumed in this part of the description. In this case, most of the state of the H.264 decoder that can be corrupted by bit stream errors lies in the reference picture.

Parts of the codec state not related to single reference picture shall be discussed later on.

According to this aspect of the invention, the encoder first calculates a checksum over the reference picture's YUV (color space) data. The precise algorithm for this calculation needs to be standardized, as both encoder and decoder need to implement equivalent operations to arrive at identical results. A simple way to implement the checksum would be to use a 16 bit CRC, and mandate that the CRC be calculated over the 8 least significant bits of the samples of the Y, U, V color planes, in scan order, respectively.

However, many other forms of calculation are also possible. For example, more advanced checksums such as SHA1, MD5, or other frequently used integrity checkers can be employed. It is also possible to modify the order of the samples. As mentioned, what matters is that both encoder and decoder have a common understanding and an equivalent implementation of the checksum calculation.

Once the checksum is calculated, it is converted into a suitable representation (e.g. binary, base16, base64, etc.) and placed into the bit stream, e.g. in the form of an SEI message. Alternatively, the message can also be sent out of band, that is, outside the bit stream, by utilizing an appropriate protocol. One example for an appropriate protocol would be an RTCP Sender Report (see IETF RFC 3550). In this case, means to synchronize the message with the video bit streams are required; when SEI messages are used, the synchronization is implicit.

Thereafter, the encoder codes the picture and sends it on. When the decoder receives the checksum (from the SEI message or out-of-band means) and the coded picture, it can choose to ignore the checksum, e.g. when it is cycle-starving. However, it can also check the checksum received against a checksum calculated from its own reference picture buffer. If the two checksums match, the decoder knows for sure that its reference picture, at the time starting with decoding the picture in question, is not corrupted.

If the checksum test fails, however, it may react accordingly, e.g. by sending a prior art feedback message indicating the reference picture corruption (e.g. in the form of a Full Intra Request message) to the encoder, and not decode the bit stream at all. There are many advantages of this mechanism: the integrity check can take place while the bit stream of the new picture is still being received—leading to an early sending of a prior art feedback message. And, as mentioned, in some environments corruption could not be detected at all from the bit stream and/or transport environment, whereas this is possible with the present invention.

The in-band SEI message (or an equivalent out-of-band message) can be sent as frequently as the encoder desires, thereby allowing for a tuning of the tradeoff between error detection capability and bandwidth overhead.

Now it shall be described how a message from a decoder to the encoder can facilitate an appropriate reaction of the encoder responsive to the state of the decoder (once known) ("use case 2").

For simplicity it is assumed again that the parameter sets are fixed, and that only a single reference picture is used.

According to this aspect of the invention, the decoder calculates a checksum over the data of the reference picture as discussed above. How frequently this calculation is performed is up to the decoder, e.g. after every picture decoding, in fixed intervals, in variable intervals determined by the needs of external protocols (e.g. RTCP receiver report intervals, see the discussion in IETF RFC 3550), etc. Once the checksum is generated, the decoder sends it to the encoder, using an appropriate protocol. One example for such a protocol would be RTCP receiver reports, see IETF RFC 3550. Some of these protocols may inherently support synchronization with the video sender (e.g. RTCP in the form of the timestamp); in other environments, the message may need to contain an identification of the point of generation of the picture over which the checksum was generated.

The encoder, once having received the message, may choose to ignore it. However, it could also try to check the integrity of its local reference picture utilizing the received checksum. It is to be noted that this process may require the encoder to calculate checksums for all pictures that it sends during the round trip delay time of the picture (and back channel) transmission.

When the encoder identifies that the reference picture at the decoder is uncorrupted, it can continue its normal operation, which usually consists of coding and sending only predictively coded pictures. If the encoder identifies that the decoder's reference picture is corrupt, it also can react accordingly, i.e. by sending an intra coded picture.

Other properties of a state are highly dependent on the codec technology employed. Again using H.264 as an example, at least the following categories of state information can be identified:

Parameter sets; and (multiple) reference pictures sample values.

All these shall be briefly discussed.

H.264 introduces with its parameter set concept the decoupling of data pertaining to more than a single slice from the slice/macro block/block data. H.264 requires the "active" sequence and picture parameter to be available when slice decoding starts, but does not include any mechanisms to integrity check the parameter sets. Therefore, additional mechanisms supporting the integrity check are useful under error prone conditions.

Two types of parameter sets exist: Picture Parameter Sets (PPS) and Sequence Parameter Sets (SPS). Both are stored in numbered locations. The slice header of each slice contains indexing information to reference the active PPS, and each PPS contains indexing information about the related SPS. PPS's can grow large—several KB—under certain conditions. To allow for complexity scalability, according to the invention, checksums can be generated over active PPS(s)—H.264 (2005) allows only a single active PPS, but future extensions of H.264 may allow more than one, active SPS(s)—H.264 (2005) allows only a single active SPS, but future extensions of H.264 may allow more than one, active PPS(s) and active SPS(s) (thereby covering all parameter sets relevant for the decoding of the current picture—the perhaps most common use case), PPS with index x, SPS with index x, PPS with index x and the SPS(s) that is referenced in the PPS with index x, all PPS, all SPS, and all PPS and SPS.

H.264, in its 2005 version, does not contain initialization information for parameter sets. In other words, the value of an individual parameter in a parameter set is undefined before being transmitted first. The checksum calculation algorithm for parameter sets has to be designed to take this property into account. One possible solution is to infer all parameters in an uninitialized parameter set with the value zero. Other solutions may also be possible and obvious for a person skilled in the art. The precise design of the inferring is irrelevant for the invention, as long as encoder and decoder utilize the same design.

In H.264, but also in some older video compression standards such as H.263 when Annex N or U are in use or MPEG-4 Part 2 (please see ISO/IEC 14496-2) with enabled "Advanced Real-Time Simple Profile" (ARTS profile), more than one reference picture can be employed. The reference picture in use is indicated by what could be called the "temporal" component of a three-dimensional motion vector. Depending on the standard, this vector component may be part of the picture, slice, or macro block syntactical layers. H.264 also allows bi-prediction from two reference pictures.

When multiple reference pictures are allowed, obviously an integrity check over all, or a subset, of these reference pictures can be helpful. The most common cases are explicitly mentioned here, although a person skilled in the art is aware of other cases that are equally valid for certain applications.

According to this invention, the following cases are primarily considered as useful:

most recent reference picture in the Decoded Picture Buffer (DPB); this is in most cases (unless being moved by an H.264 Memory Management Control Operation MMCO command) the previously decoded picture where the corruption is most likely, all reference pictures in the DPB used for prediction; primarily useful for the encoder-to-decoder direction of the method of the invention; the checksum is calculated over all reference pictures used for prediction of the picture being encoded, all reference pictures in the DPB.

H.264 in its 2005 version contains support for color spaces other than YUV 4:2:0. One possible mechanism for generating a checksum for the YUV 4:2:0 color space has already been introduced above. A person skilled in the art is capable of designing checksum algorithms for other color spaces as well. The design of these checksum algorithms is in principle irrelevant for this invention, as long as encoder and decoder utilize the same design.

Figure 2:
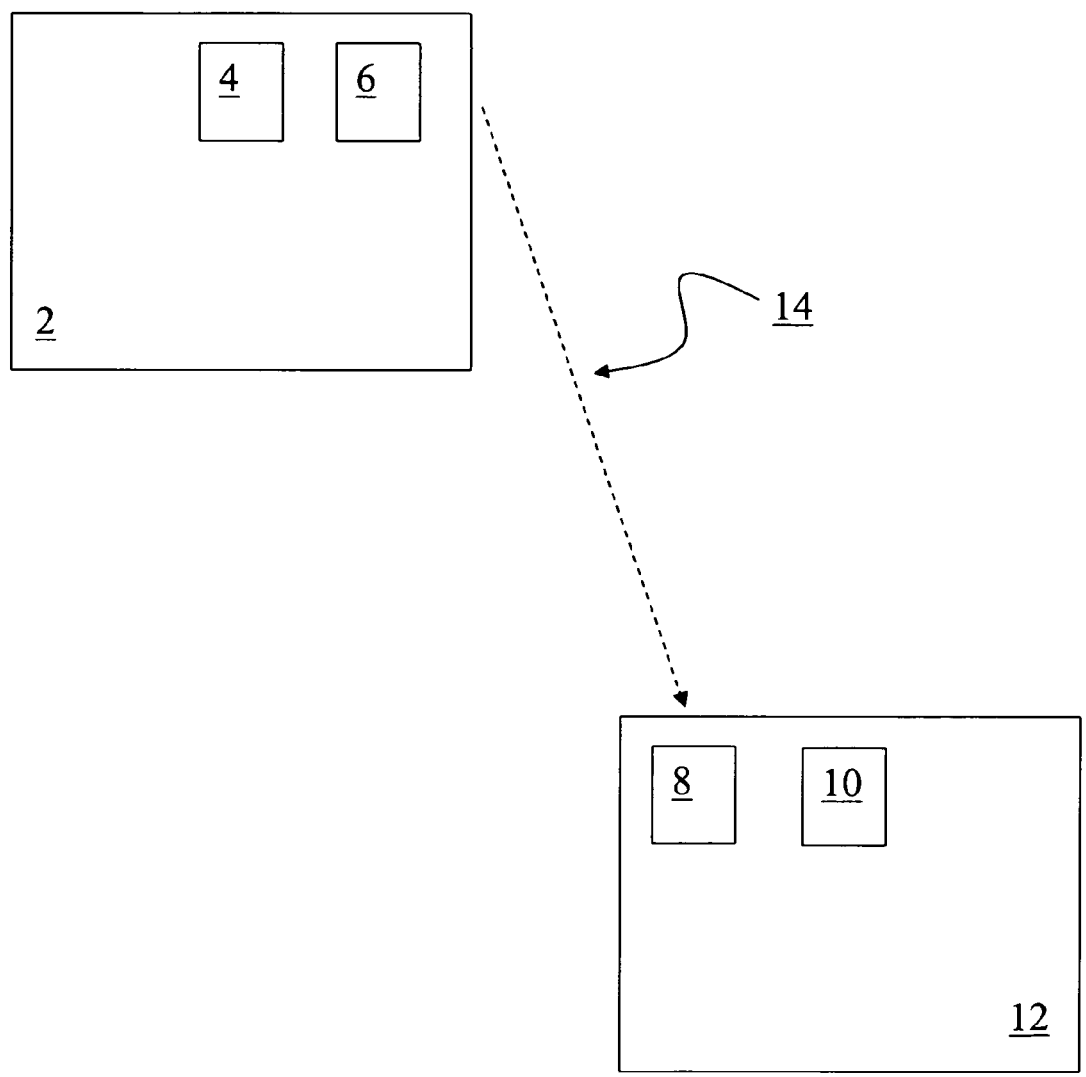
FIG. 2 illustrates an embodiment of the system of the present invention.

FIG. 2 depicts an embodiment of the system of the present invention. A first video processor 2 comprises a component 4 for generating a first indication of one or more properties of a first state of said first video processor, and a component 6 for transmitting a message 14 comprising said indication to a second video processor 12. The second video processor 12 comprises a component 8 for generating a second indication of said properties of a second state of said second video processor, and a component 10 for verifying if said first and second states of said first and second video processors match, by comparing said first and second indications.

In a further embodiment an additional component is provided, for performing error handling procedures in case the states do not match.

What is claimed is:

1. A method comprising:

generating, at a first video processor, a first indication of one or more properties, said one or more properties associated with a first state of said first video processor;

transmitting a message comprising said indication to a second video processor, said indication being used for determining whether there is a match between said first state of said first video processor and a second state of said second video processor;

wherein said first video processor being associated with one of a video encoder utilizing predictive video encoding and a video decoder configured to reproduce a decoded video sequence from an encoded bit stream and said second video processor being associated with the other of the video encoder and the video decoder.

2. The method of claim 1, wherein said first indication comprises a checksum, and wherein said generating said first indication comprises calculating said checksum.

3. The method of claim 2, wherein said checksum is calculated by at least one algorithm from a group comprising Binary Copy, Exclusive OR (XOR), Cyclic Redundancy Code (CRC), Secure Hash Algorithm (SHA1), Message Digest 5 (MD5).

4. The method of claim 1, wherein said indication comprises an encoded copy of said one or more properties associated with said first state according to at least one encoding method from a group comprising Binary, Base16, Base64 and Abstract Syntax Notation 1.

5. The method according to claim 1, wherein said properties of said first state comprise at least one from a group comprising:
   active Picture Parameter Sets;
   active Sequence Parameter Sets;
   Picture Parameter Sets with index x;
   Sequence Parameter Sets with index x;
   Picture Parameter Sets with index x and referred Sequence Parameter Sets;
   all Picture Parameter Sets;
   all Sequence Parameter Sets;
   most recent reference picture in the Decoded Picture Buffer;
   all reference pictures in the Decoded Picture Buffer used for prediction; and
   all reference pictures in the Decoded Picture Buffer.

6. The method according to claim 1, wherein said first video processor is said video encoder and said second video processor is said video decoder.

7. The method according to claim 6, wherein said message is transmitted inside of said bit stream.

8. The method according to claim 7, wherein said message is a Supplemental Enhancement Information message.

9. The method according to claim 6, wherein said message is transmitted separately from said bit stream.

10. The method of claim 9, wherein said message also comprises synchronization information for associating said indication with the point of generation of said indication.

11. The method according to claim 1, wherein said first video processor is said video decoder and said second video processor is said video encoder.

12. The method according to claim 11, wherein said message is transmitted using at least one protocol from a group comprising Real-Time Control Protocol, H.225 and H.245.

13. The method according to claim 12, wherein said message also comprises synchronization information for associating said indication with the point of generation of said indication.

14. A method comprising:
   receiving, from a first video processor at a second video processor, a message comprising an indication of one or more properties, said one or more properties being associated with a first state of said first video processor;
   generating, at said second video processor, a second indication of another one or more properties said another one or more properties being associated with a second state of said second video processor; and
   determining whether there is a match between said first state of said first video processor and said second state of said second video processor by comparing said first indication and said second indication.

15. The method of claim 14, further comprising performing error handling procedures in case said states do not match.

16. The method of claim 14, wherein said second indication comprises a checksum, and wherein said generating said second indication comprises calculating said checksum.

17. The method of claim 16, wherein said checksum is calculated by at least one algorithm from a group comprising Binary Copy, Exclusive OR, Cyclic Redundancy Code, Secure Hash Algorithm, Message Digest 5.

18. A computer readable medium, comprising code sections stored thereon, for causing an apparatus to perform:
   generating, at a first video processor, a first indication of one or more properties, said one or more properties being associated with a first state of said first video processor; and
   transmitting a message comprising said indication to a second video processor, said indication being for use in comparing said first state of the first video processor to a second state of said second video processor.

19. A computer readable, comprising code sections stored thereon, for causing an apparatus to perform:
   receiving, from a first video processor at a second video processor, a message comprising an indication of one or more properties, said one or more properties being associated with a first state of said first video processor;
   generating, at said second video processor, a second indication of another one or more properties said another one or more properties being associated with second state of said second video processor; and
   determining whether there is a match between said first state of said first video processor and said second state of said second video processor, by comparing said first indication and said second indication.

20. A system comprising:
   a first video processor configured to:
   generate a first indication of one or more properties, said one or more properties being associated with a first state of the first video processor;
   transmit a message comprising the first indication to a second video processor; and
   the second video processor, wherein the second video processor is configured to:
   receive said message comprising the first indication from the first video processor;
   generate a second indication of another one or more properties, said another one or more properties being associated with a second state of the second video processor; and
   determine whether there is a match between said first state of said first video processor and said second state of said second video processor by comparing said first indication and said second indication.

21. The system according to claim 20, wherein said second video processor is further configured to perform error handling procedures in case said first state and said second state do not match.

* * * * *

UNITED STATES PATENT AND TRADEMARK OFFICE
CERTIFICATE OF CORRECTION

| | | |
|---|---|---|
| PATENT NO. | : 7,827,467 B2 | Page 1 of 1 |
| APPLICATION NO. | : 11/325264 | |
| DATED | : November 2, 2010 | |
| INVENTOR(S) | : Stephan Wenger et al. | |

It is certified that error appears in the above-identified patent and that said Letters Patent is hereby corrected as shown below:

Column 10, Claim 19, line 32: "with second" should be --with a second--.

Signed and Sealed this
Fifteenth Day of February, 2011

David J. Kappos
*Director of the United States Patent and Trademark Office*